(12) United States Patent
Chen et al.

(10) Patent No.: US 8,736,782 B2
(45) Date of Patent: May 27, 2014

(54) NOTEBOOK COMPUTER AND LIQUID CRYSTAL DISPLAY MODULE HAVING PARTICULAR ANTENNA STRUCTURE

(75) Inventors: Chin-Lung Chen, Hsin-Chu (TW); Jeng-Bin Hsu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 51 days.

(21) Appl. No.: 13/415,847

(22) Filed: Mar. 9, 2012

(65) Prior Publication Data

US 2012/0281162 A1 Nov. 8, 2012

(30) Foreign Application Priority Data

May 5, 2011 (TW) .............................. 100115756 A

(51) Int. Cl.
- *G02F 1/1333* (2006.01)
- *G02F 1/133* (2006.01)
- *H01Q 9/30* (2006.01)
- *H01Q 1/12* (2006.01)

(52) U.S. Cl.
USPC ................... 349/58; 349/59; 349/33; 349/34; 343/900; 343/892

(58) Field of Classification Search
USPC ................... 349/58, 59, 33, 34; 343/900, 892
See application file for complete search history.

(56) References Cited

U.S. PATENT DOCUMENTS

| | | | | |
|---|---|---|---|---|
| 6,728,559 | B2 * | 4/2004 | Masaki | 455/575.5 |
| 6,804,110 | B2 * | 10/2004 | Amemiya et al. | 361/679.27 |
| 6,809,690 | B2 * | 10/2004 | Tao | 343/702 |
| 8,125,772 | B2 * | 2/2012 | Kim | 361/679.24 |
| 2008/0309842 | A1 | 12/2008 | Kim | |

FOREIGN PATENT DOCUMENTS

| | | |
|---|---|---|
| CN | 1299193 | 6/2001 |
| TW | M302137 | 12/2006 |
| TW | M342006 | 10/2008 |
| TW | M380585 | 5/2010 |

OTHER PUBLICATIONS

"Office Action of Taiwan Counterpart Application", issued on Dec. 24, 2014, p. 1-p. 5.

* cited by examiner

*Primary Examiner* — Mike Qi
(74) *Attorney, Agent, or Firm* — Jianq Chyun IP Office

(57) ABSTRACT

A notebook computer includes a host and a display device. The display device includes a casing and a liquid crystal display module. The casing is pivoted to the host. The liquid crystal display module includes a back cover, a light guide plate, a liquid crystal panel, a light source, and an antenna. The back cover is disposed in the casing. The light guide plate is disposed on and supported by the back cover. The liquid crystal panel is disposed on and supported by the back cover, and the light guide plate is located between the back cover and the liquid crystal panel. The light source is disposed on a side surface of the light guide plate. The antenna is integrally connected to the back cover.

10 Claims, 3 Drawing Sheets

NOTEBOOK COMPUTER AND LIQUID CRYSTAL DISPLAY MODULE HAVING PARTICULAR ANTENNA STRUCTURE

CROSS-REFERENCE TO RELATED APPLICATION

This application claims the priority benefit of Taiwan application serial no. 100115756, filed on May 5, 2011. The entirety of the above-mentioned patent application is hereby incorporated by reference herein and made a part of this specification.

BACKGROUND OF THE INVENTION

1. Field of the Invention

The invention relates to an electronic device and a display module thereof. More particularly, the invention relates to a liquid crystal display module (LCM) and a notebook computer having the LCM.

2. Description of the Related Art

Similar to normal desktop computers, notebook computers can perform certain functions. Owing to the compact design, the notebook computers featuring portability have become indispensable to users. Since the prices of the notebook computers are continuously reduced, some users even tend to replace the desktop computers with the notebook computers. With the popularity of wireless network, the notebook computers are no longer subject to the trammel of a network cable, and the users of the notebook computers can access the internet anywhere within the coverage of the wireless network.

A notebook computer is constituted by a host and a display device that are pivoted to each other, and an antenna for receiving network signals is often configured in the display device. To enhance the gain of the antenna, metal elements having certain volume are frequently configured in the display device, and the antenna can then be grounded through the metal elements. Here, the antenna can be connected to the metal elements through conductive tapes or screws. However, the configuration of the metal elements leads to an increase in the manufacturing cost and the weight of the notebook computer, and the use of the conductive tapes or the screws requires additional labor hours.

Taiwan Patent No. M380585 discloses an electronic device in which antenna circuits are directly printed on a back cover or are attached to the back cover in form of a flexible circuit board. Taiwan Patent No. M342006 discloses a handheld electronic device in which an antenna module is pivoted to a cover of the handheld electronic device and is suitable for being unfolded with respect to the cover. Taiwan Patent No. M302137 discloses a notebook computer in which an antenna is connected to a gasket of a back plate in a display device. U.S. Pat. No. 6,809,690 discloses a notebook computer in which an antenna is connected to a metal frame in a display device.

SUMMARY OF THE INVENTION

The invention is directed to a notebook computer with light weight and low manufacturing costs.

The invention is further directed to a liquid crystal display module (LCM) with light weight and low manufacturing costs.

Other advantages of the invention can be further illustrated by the technical features broadly embodied and described as follows.

In order to achieve one or a part of or all of the above advantages or other advantages, an embodiment of the invention provides a notebook computer that includes a host and a display device. The display device includes a casing and an LCM. The casing is pivoted to the host. The LCM includes a back cover, a light guide plate (LGP), a liquid crystal panel, a light source, and an antenna. The back cover is disposed in the casing. The LGP is disposed on and supported by the back cover. The liquid crystal panel is disposed on and supported by the back cover, and the LGP is located between the back cover and the liquid crystal panel. The light source is disposed on a side surface of the LGP. The antenna is integrally connected to the back cover.

In order to achieve one or a part of or all of the above advantages or other advantages, an embodiment of the invention provides an LCM that is adapted to a notebook computer. The LCM includes a back cover, an LGP, a liquid crystal panel, a light source, and an antenna. The back cover is disposed in the casing. The LGP is disposed on and supported by the back cover. The liquid crystal panel is disposed on and supported by the back cover, and the LGP is located between the back cover and the liquid crystal panel. The light source is disposed on a side surface of the LGP. The antenna is integrally connected to the back cover.

Based on the above, the notebook computer and the LCM thereof described in the embodiments of the invention have at least one of the following advantages. The antenna is integrally connected to the back cover of the LCM, such that the antenna can be grounded through the back cover. Thereby, it is not necessary for the LCM to be additionally equipped with metal elements for the antenna to be grounded, and the overall weight of the LCM can be reduced. In addition, the antenna is integrally formed in the process of manufacturing the back cover. Hence, it is not necessary to provide the antenna separately as well as install and ground the antenna. As such, the manufacturing cost and the labor hour can both be reduced.

Other objectives, features and advantages of the invention will be further understood from the further technological features disclosed by the embodiments of the invention wherein there are shown and described embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Additionally, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Besides, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
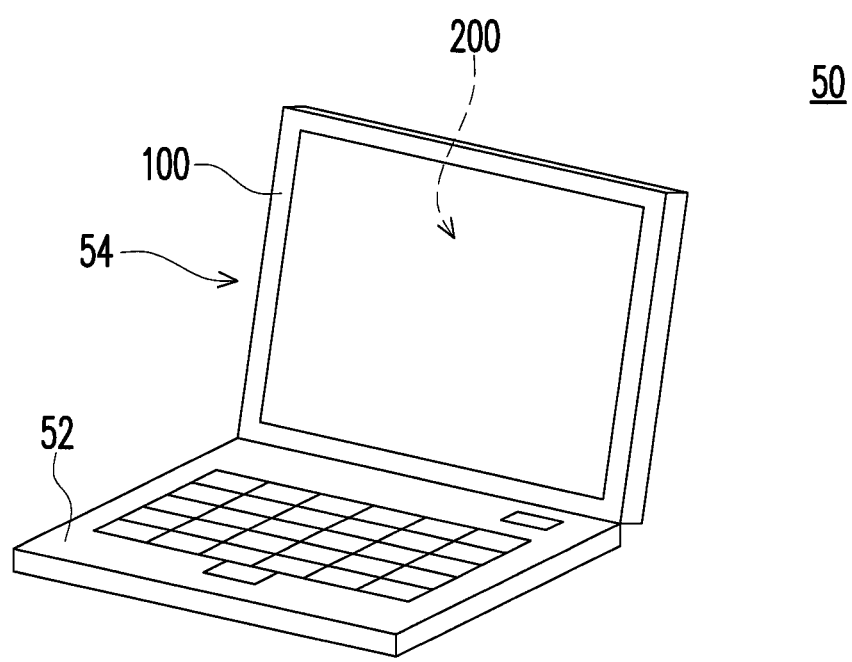
FIG. 1 is a three-dimensional view illustrating a notebook computer according to an embodiment of the invention.

FIG. 1 is a three-dimensional view illustrating a notebook computer according to an embodiment of the invention. With reference to FIG. 1, the notebook computer 50 of this embodiment includes a host 52 and a display device 54. The display device 54 includes a casing 100 and a liquid crystal display module (LCM) 200. The casing 100 is pivoted to the host 52, and thereby the display device 54 is suitable for being folded or unfolded with respect to the host 52.

Figure 2:
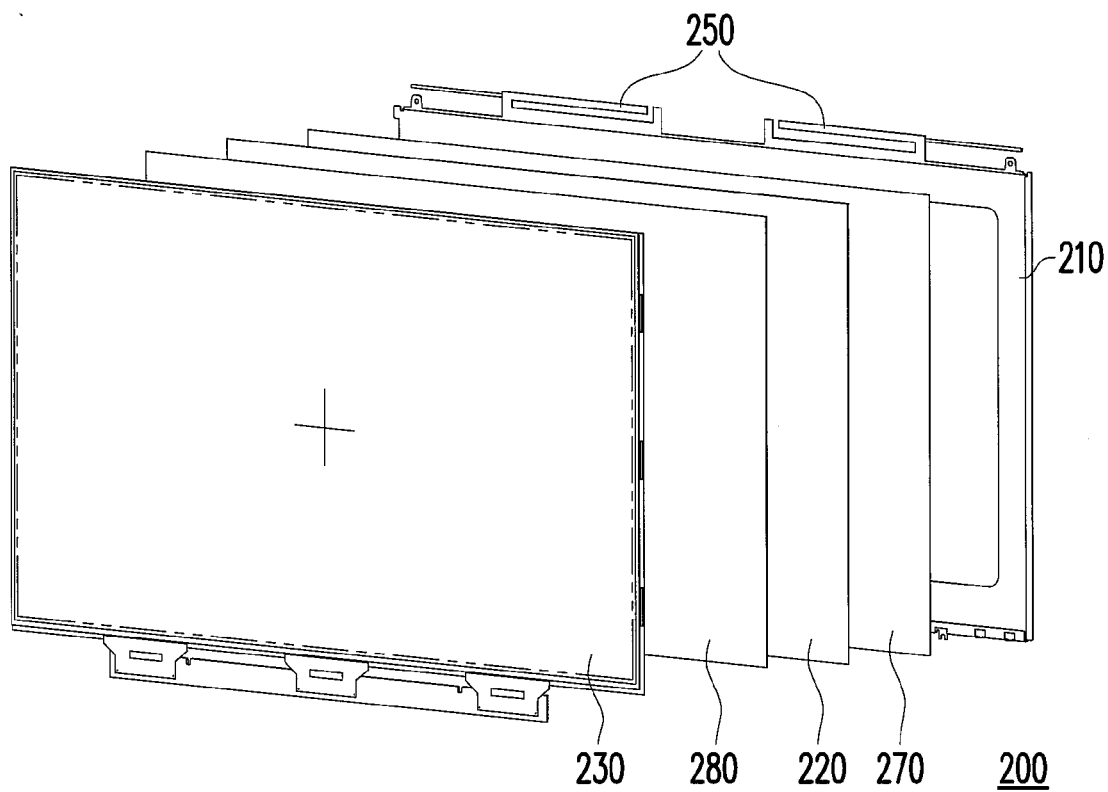
FIG. 2 is an explosive view illustrating some components in the LCM depicted in FIG. 1.
Figure 3:
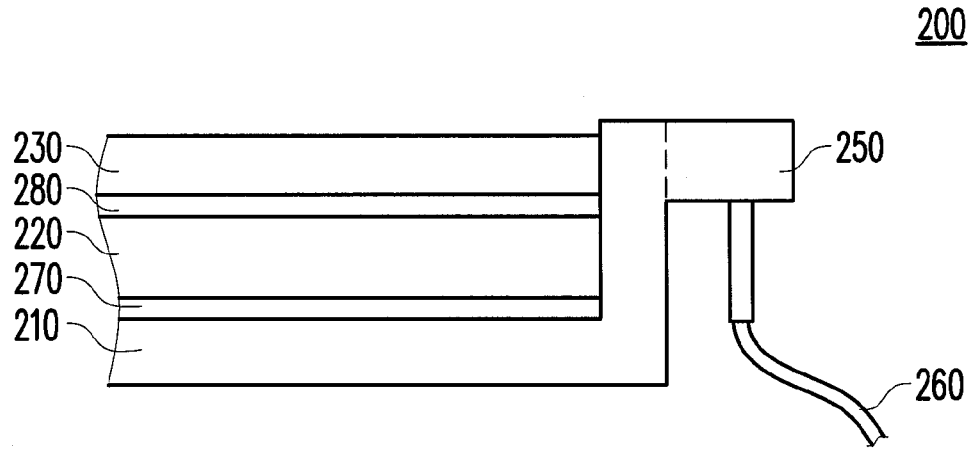
FIG. 3 is a schematic partial cross-sectional view illustrating the LCM depicted in FIG. 1.
Figure 4:
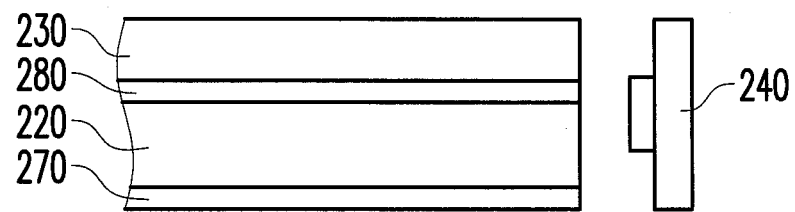
FIG. 4 is a schematic partial cross-sectional view illustrating the LCM depicted in FIG. 1.

FIG. 2 is an explosive view illustrating some components in the LCM depicted in FIG. 1. FIG. 3 is a schematic partial cross-sectional view illustrating the LCM depicted in FIG. 1. FIG. 4 is also a schematic partial cross-sectional view illustrating the LCM depicted in FIG. 1. With reference to FIG. 2 to FIG. 4, the LCM 200 includes a back cover 210, a light guide plate (LGP) 220, a liquid crystal panel 230, a light source 240, and an antenna 250. In FIG. 2, two antennas 250 are depicted. The back cover 210 is disposed in the casing 100 depicted in FIG. 1. The LGP 220 and the liquid crystal panel 230 are respectively disposed on and supported by the back cover 210, and the LGP 220 is located between the back cover 210 and the liquid crystal panel 230. The light source 240 is disposed on a side surface of the LGP 220, and the light emitted by the light source 240 is suitable for passing through the LGP 220 and being transmitted to the liquid crystal panel 230. The antennas 250 are integrally connected to the back cover 210, and thus the back cover 210 serves as the ground of the antennas 250. According to this embodiment, the light source 240 is a light emitting diode (LED), for instance. However, in other embodiments of the invention, the light source 240 can be a cold cathode fluorescent lamp (CCFL) or any other appropriate light emitting device.

Based on the configuration described above, it is not necessary for the display device 54 to be additionally equipped with metal elements for grounding the antennas 250, and thus the overall weight of the notebook computer 50 can be reduced. Besides, the back cover 210 and the antennas 250 can be made of metal (e.g., aluminum, iron, and so on), and the antennas 250 can be integrally formed in the process of manufacturing the back cover 210. Hence, it is not necessary to provide the antennas 250 separately as well as install and ground the antennas 250. As such, the manufacturing cost and the labor hour can both be reduced.

With reference to FIG. 3, in this embodiment, the LCM 200 further includes a connection wire 260 through which the antenna 250 is electrically connected to the host 52 depicted in FIG. 1. The antenna 250 of this embodiment receives wireless network signals and transmits the same to the host 52 through the connection wire 260, for instance.

In this embodiment, the LCM 200 further includes a reflective film 270 and at least one optical film 280. The reflective film 270 is disposed between the LGP 220 and the back cover 210, and the optical film 280 is disposed between the LGP 220 and the liquid crystal panel 230. Optical film 280 can be at least one of a diffusion sheet, a prism, and a brightness enhancement film. The LGP 220, the light source 240, the reflective film 270, and the optical film 280 can constitute a back light module for providing the liquid crystal panel 230 with the light required for displaying images.

Figure 5:
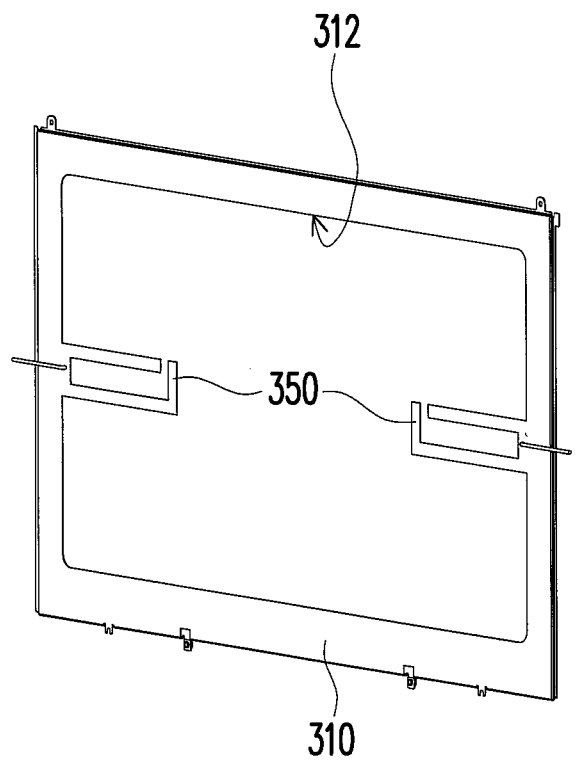
FIG. 5 is a three-dimensional view illustrating a back cover and an antenna according to another embodiment of the invention.

As shown in FIG. 2, the antenna 250 of this embodiment extends from the side surface of the back cover 210. The antenna 250 in other embodiments can be connected to other parts of the back cover 210, as exemplified in FIG. 5. This should not be construed as a limitation to the invention. FIG. 5 is a three-dimensional view illustrating a back cover and an antenna according to another embodiment of the invention. With reference to FIG. 5, the back cover 310 of this embodiment has an opening 312. The antenna 350 is integrally connected to the back cover 310, and the antenna 350 extends from an inner edge of the opening 312. Since the antenna 350 extends from the inner edge of the opening 312 and does not exceed the boundary of the back cover 310, the internal space of the notebook computer can be further economized, and the width of border frame of display device can be reduced (i.e., the notebook computer can have the slim border design).

In light of the foregoing, the notebook computer and the LCM thereof described in the embodiments of the invention have at least one of the following advantages. The antenna is integrally connected to the back cover of the LCM, such that the antenna can be grounded through the back cover. Accordingly, it is not necessary for the display device to be additionally equipped with the metal elements for grounding the antenna, and the overall weight of the notebook computer can be reduced. In addition, the antenna is integrally formed in the process of manufacturing the back cover. Hence, it is not necessary to provide the antenna separately as well as install and ground the antenna. As such, the manufacturing cost and the labor hour can both be reduced. Moreover, the antenna can be designed to extend from the inner edge of the opening of the back cover without exceeding the boundary of the back cover, so as to further economize the internal space of the notebook computer.

The foregoing description of the exemplary embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Apparently, many modifications and variations will be apparent to practitioners skilled in this art. The exemplary embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment. Any of the embodiments or any of the claims of the invention does not need to achieve all of the advantages or features disclosed by the present invention. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the disclosure is intended to be dedicated to the public regardless of whether the element or component is explicitly recited in the following claims.

What is claimed is:

1. A notebook computer comprising:
a host; and
a display device comprising:
a casing pivoted to the host; and
a liquid crystal display module comprising:
a back cover disposed in the casing;
a light guide plate disposed on and supported by the back cover;
a liquid crystal panel disposed on and supported by the back cover, wherein the light guide plate is located between the back cover and the liquid crystal panel;
a light source disposed on a side surface of the light guide plate; and
an antenna integrally connected to the back cover, wherein the back cover has an opening, and the antenna extends from an inner edge of the opening.

2. The notebook computer as recited in claim 1, wherein the liquid crystal display module further comprises a connection wire, and the antenna is electrically connected to the host through the connection wire.

3. The notebook computer as recited in claim 1, wherein the liquid crystal display module further comprises a reflective film disposed between the light guide plate and the back cover.

4. The notebook computer as recited in claim 1, wherein the liquid crystal display module further comprises at least one optical film disposed between the light guide plate and the liquid crystal panel.

5. The notebook computer as recited in claim 1, wherein a material of the antenna and a material of the back cover respectively comprise metal.

6. A liquid crystal display module adapted to a notebook computer, the liquid crystal display module comprising:
a back cover;
a light guide plate disposed on and supported by the back cover;
a liquid crystal panel disposed on and supported by the back cover, wherein the light guide plate is located between the back cover and the liquid crystal panel;
a light source disposed on a side surface of the light guide plate; and
an antenna integrally connected to the back cover, wherein the back cover has an opening, and the antenna extends from an inner edge of the opening.

7. The liquid crystal display module as recited in claim 6, further comprising a connection wire, wherein the antenna is electrically connected to a host of the notebook computer through the connection wire.

8. The liquid crystal display module as recited in claim 6, further comprising a reflective film disposed between the light guide plate and the back cover.

9. The liquid crystal display module as recited in claim 6, further comprising at least one optical film disposed between the light guide plate and the liquid crystal panel.

10. The liquid crystal display module as recited in claim 6, wherein a material of the antenna and a material of the back cover respectively comprise metal.

* * * * *